United States Patent
Oh et al.

(10) Patent No.: US 9,148,620 B2
(45) Date of Patent: Sep. 29, 2015

(54) DETECTING VIDEO FORMATS

(75) Inventors: Jong Dae Oh, Folsom, CA (US); Yi-Jen Chiu, San Jose, CA (US); Sang-Hee Lee, Santa Clara, CA (US); Ning Lu, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1001 days.

(21) Appl. No.: 13/083,681

(22) Filed: Apr. 11, 2011

(65) Prior Publication Data
US 2012/0257104 A1   Oct. 11, 2012

(51) Int. Cl.
*H04N 7/01*   (2006.01)
(52) U.S. Cl.
CPC .................................. *H04N 7/0115* (2013.01)
(58) Field of Classification Search
None
See application file for complete search history.

(56) References Cited

U.S. PATENT DOCUMENTS

| | | | |
|---|---|---|---|
| 7,280,155 B2 | 10/2007 | Law et al. | |
| 7,349,029 B1* | 3/2008 | Chou | 348/448 |
| 8,027,382 B2 | 9/2011 | Foret | |
| 2005/0231596 A1* | 10/2005 | Marchese | 348/187 |
| 2008/0158350 A1 | 7/2008 | Lu | |
| 2008/0175473 A1* | 7/2008 | Kim | 382/172 |
| 2009/0051809 A1 | 2/2009 | Capps | |
| 2010/0225823 A1* | 9/2010 | Diggins | 348/699 |
| 2012/0176538 A1* | 7/2012 | Madnani et al. | 348/446 |

OTHER PUBLICATIONS

PCT International Search Report and Written Opinion issued in corresponding PCT/US2012/033062, dated Oct. 29, 2012 (8 pages).

* cited by examiner

*Primary Examiner* — William C Vaughn, Jr.
*Assistant Examiner* — Eileen Adams
(74) *Attorney, Agent, or Firm* — Trop, Pruner & Hu, P.C.

(57) ABSTRACT

The format of telecined video may be determined including a bottom field first cadence. In addition, video using 2:3:3:2 top field first can be identified. Moreover, mixed cadence videos can also be detected. In some embodiments, mixed cadence videos may be detected by calculating variances of different areas within a frame.

26 Claims, 2 Drawing Sheets

DETECTING VIDEO FORMATS

BACKGROUND

This relates generally to processing of video information and, particularly, to identifying video format.

Video may have different formats based on how it is initially recorded. Different recording or imaging devices may record the video in different formats. As an example, different video formats may include interlaced versus progressive formats, using top field first or bottom field first, etc.

In order to process video, it is desirable to know which format the video is actually in. Knowing this information, the format may be changed to better match the format generally used by an available video display device. If the video is not formatted properly for the display, viewers may see interlacing artifacts in the displayed images.

DETAILED DESCRIPTION

Figure 1:
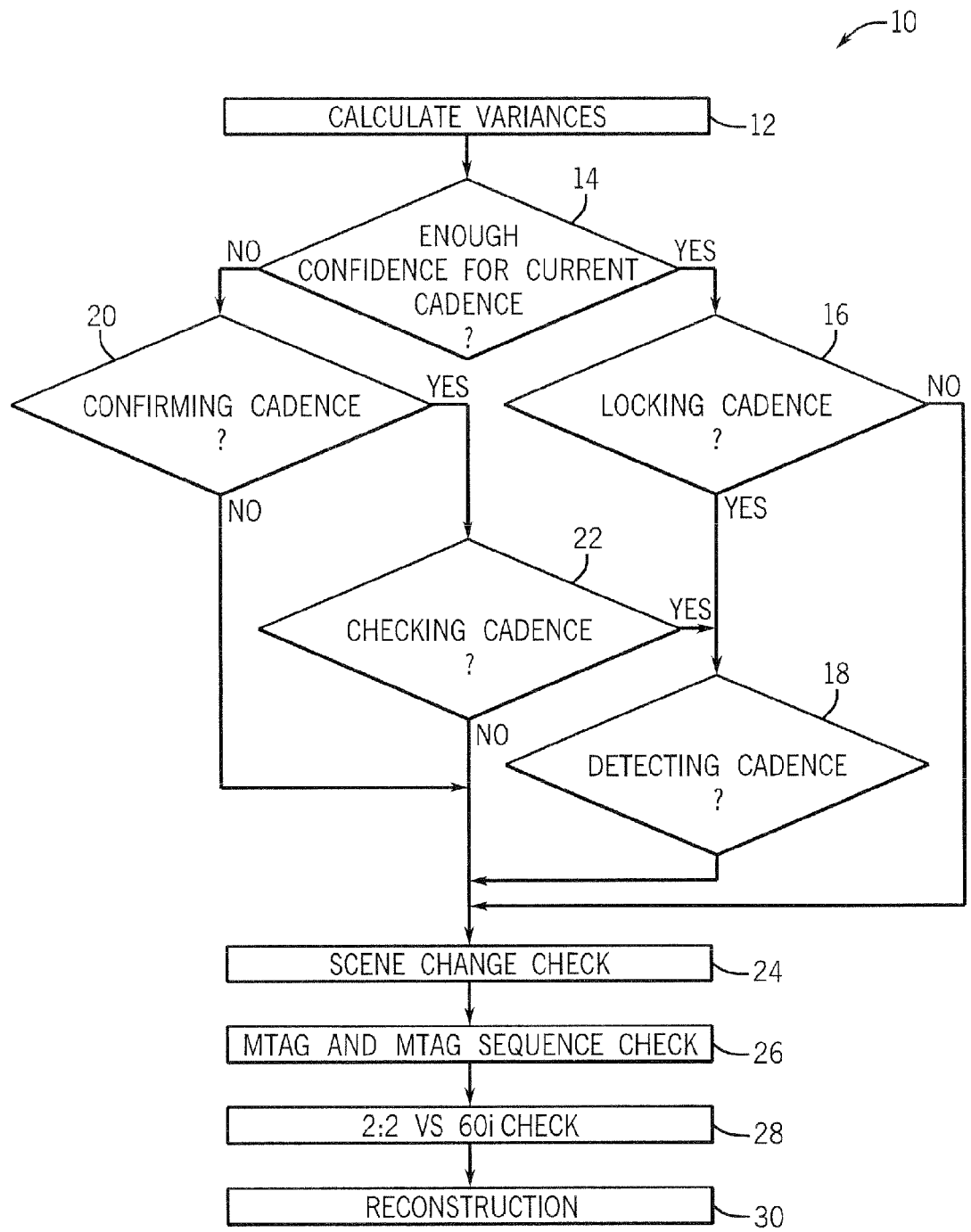
FIG. 1 is a flow chart for one embodiment of the present invention.
Figure 2:
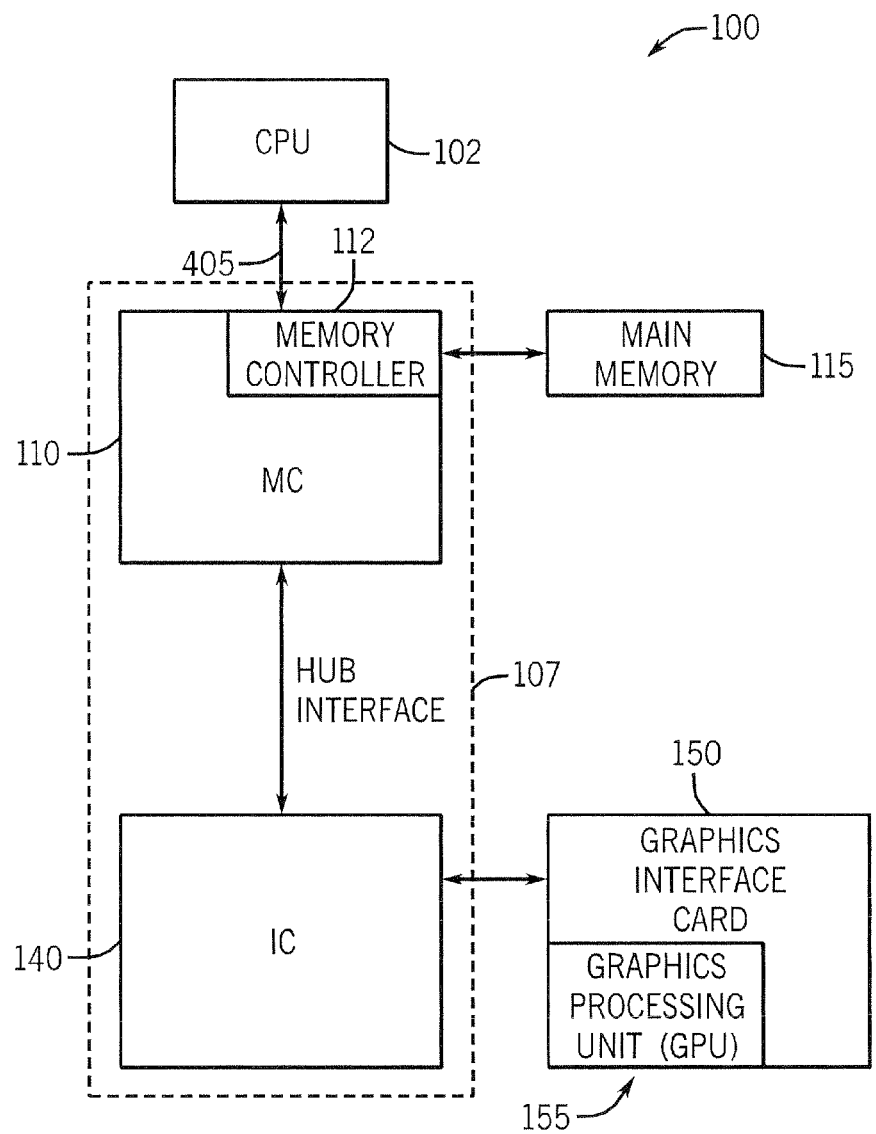
FIG. 2 is a hardware schematic depiction of one embodiment of the present invention.

In accordance with some embodiments, the format of telecined video may be determined automatically and may be reconstructed into another format.

Video can be broken into two fields. In interlaced video, one line from each field is displayed alternately. In progressive video, the two fields are not interlaced. In top field first video, the top field is displayed first and, in bottom field first, the bottom field is displayed first or at the top.

Telecined video generally has six different cadences. In addition there are two special cases, mixed cadence video and progressive versus interlaced video. Mixed cadence video is video which has two different cadences in the same display or frame. Progressive versus interlaced video detection are two alternate video formats.

In accordance with some embodiments, 16 variances of two consecutive frames may be calculated. There are three major variance records or variables that arise from the variances. One major variance is the top field repetition between the current and previous frames. For example, the top field may be the same or it may be different between two particular consecutive frames. Another major variance is bottom field repetition between current and previous frames. The third major variance is interlaced video information that is based on the difference between the current top field and bottom field.

Based on these three variables or variance records, a confidence level may be determined for the current cadence or video format. If the confidence level is high enough, the current cadence may be confirmed first. Otherwise, the system may try to lock and detect a new cadence.

The 16 video formats or cadences are set forth in the chart below.

TABLE 1

| Cadences | Periodicity | Frame patterns | | | | | | | | | | | |
|---|---|---|---|---|---|---|---|---|---|---|---|---|---|
| 60i | 1 | | T0B1 | T2B3 | T4B5 | T6B7 | T8B9 | ... | | | | | |
| 30 fps | | FRP: | 00 | 00 | 00 | 00 | 00 | ... | | | | | |
| | | ITL: | 1 | 1 | 1 | 1 | 1 | ... | | | | | |
| | | PFF: | 00 | 00 | 00 | 00 | 00 | ... | | | | | |
| 2:2 (30p) | 1 | | T0B0 | T1B1 | T2B2 | T3B3 | T4B4 | ... | | | | | |
| 30 fps | | FRP: | 00 | 00 | 00 | 00 | 00 | ... | | | | | |
| | | ITL: | 0 | 0 | 0 | 0 | 0 | ... | | | | | |
| | | PFF: | 00 | 00 | 00 | 00 | 00 | ... | | | | | |
| 3:2 (BFF) | 5 | | T0B0 | T1B0 | T2B1 | T2B2 | T3B3 | T4B4 | T5B4 | T6B5 | T6B6 | T7B7 | |
| (OddFF) | | FRP: | 00 | 01 | 00 | 10 | 00 | 00 | 01 | 00 | 10 | 00 | ... |
| 24 fps | | ITL: | 0 | 1 | 1 | 0 | 0 | 0 | 1 | 1 | 0 | 0 | ... |
| | | PFF: | 00 | 01 | 01 | 01 | 00 | 00 | 01 | 01 | 01 | 00 | ... |
| 2:3 (TFF) | 5 | | T0B0 | T0B1 | T1B2 | T2B2 | T3B3 | T4B4 | T4B5 | T5B6 | T6B6 | T7B7 | |
| (EvenFF) | | FRP: | 00 | 10 | 00 | 01 | 00 | 00 | 10 | 00 | 01 | 00 | ... |
| 24 fps | | ITL: | 0 | 1 | 1 | 0 | 0 | 0 | 1 | 1 | 0 | 0 | ... |
| | | PFF: | 0 | 10 | 10 | 10 | 00 | 00 | 10 | 10 | 10 | 00 | ... |
| 2:3:3:2 | 5 | | T0B0 | T1B0 | T2B1 | T3B2 | T3B3 | T4B4 | T5B4 | T6B5 | T7B6 | T7B7 | |
| (BFF) | | FRP: | 00 | 01 | 00 | 00 | 10 | 00 | 01 | 00 | 00 | 10 | ... |
| 24 fps | | ITL: | 0 | 1 | 1 | 1 | 0 | 0 | 1 | 1 | 1 | 0 | ... |
| | | PFF: | 00 | 01 | 01 | 01 | 01 | 00 | 01 | 01 | 01 | 01 | ... |
| 2:3:3:2 | 5 | | T0B0 | T1B1 | T1B2 | T2B2 | T3B3 | T4B4 | T5B5 | T5B6 | T6B6 | T7B7 | |
| (TFF) | | FRP: | 00 | 00 | 10 | 01 | 10 | 00 | 00 | 10 | 01 | 00 | ... |
| 24 fps | | ITL: | 0 | 0 | 1 | 0 | 0 | 0 | 0 | 1 | 0 | 0 | ... |
| | | PFF: | 00 | 00 | 10 | 10 | 00 | 00 | 00 | 10 | 10 | 00 | ... |
| 2:2:2:4 | 5 | | T0B0 | T1B1 | T2B2 | T3B3 | T3B3 | T4B4 | T5B5 | T6B6 | T7B7 | T7B7 | |
| 24 fps | | FRP: | 00 | 00 | 00 | 00 | 11 | 00 | 00 | 00 | 00 | 11 | ... |
| | | ITL: | 0 | 0 | 0 | 0 | 0 | 0 | 0 | 0 | 0 | 0 | ... |
| | | PFF: | 00 | 00 | 00 | 00 | 11 | 00 | 00 | 00 | 00 | 11 | ... |
| 3:2:3:2:2 | 6 | | T0B0 | T1B0 | T2B1 | T2B2 | T3B3 | T4B4 | T5B5 | T6B5 | T7B6 | T7B7 | |
| (BFF) | | FRP: | 00 | 10 | 00 | 01 | 00 | 00 | 00 | 10 | 00 | 01 | 00 | 00 | ... |
| 24 fps | | ITL: | 0 | 1 | 1 | 0 | 0 | 0 | 0 | 1 | 1 | 0 | 0 | 0 | ... |
| | | PFF: | 00 | 10 | 01 | 10 | 00 | 00 | 00 | 10 | 01 | 10 | 00 | 00 | ... |
| 3:2:3:2:2 | 6 | | T0B0 | T0B1 | T1B2 | T2B2 | T3B3 | T4B4 | T5B5 | T5B6 | T6B7 | T7B7 | |
| (TFF) | | FRP: | 00 | 00 | 01 | 00 | 10 | 00 | 00 | 00 | 01 | 00 | 10 | 00 | ... |
| 24 fps | | ITL: | 0 | 0 | 1 | 1 | 0 | 0 | 0 | 0 | 1 | 1 | 0 | 0 | ... |
| | | PFF: | 00 | 00 | 01 | 01 | 01 | 00 | 00 | 00 | 01 | 01 | 01 | 00 | ... |
| 6:4 | 5 | | T0B0 | T0B0 | T0B0 | T1B1 | T1B1 | T2B2 | T2B2 | T3B3 | T3B3 | T3B3 | |
| 12 fps | | FRP: | 00 | 11 | 11 | 00 | 11 | 00 | 11 | 11 | 00 | 11 | ... |
| | | ITL: | 0 | 0 | 0 | 0 | 0 | 0 | 0 | 0 | 0 | 0 | ... |
| | | PFF: | 00 | 11 | 11 | 00 | 11 | 00 | 11 | 11 | 00 | 11 | ... |

TABLE 1-continued

| Cadences | Periodicity | | Frame patterns | | | | | | | | | |
|---|---|---|---|---|---|---|---|---|---|---|---|---|
| 5:5 (BFF) 12 fps | 5 | FRP: ITL: PFF: | T0B0 00 0 00 | T0B0 11 0 11 | T1B0 01 1 01 | T1B1 10 0 01 | T1B1 11 0 11 | T2B2 00 0 00 | T2B2 11 0 11 | T3B2 01 1 01 | T3B3 10 0 01 | T3B3 11 0 11 ... ... ... |
| 5:5 (TFF) 12 fps | 5 | FRP: ITL: PFF: | T0B0 00 0 00 | T0B0 11 0 11 | T0B1 10 1 10 | T1B1 01 0 10 | T1B1 10 0 11 | T2B2 00 0 00 | T2B2 11 0 11 | T2B3 10 1 10 | T3B3 01 0 10 | T3B3 11 0 11 ... ... ... |
| 8:7 (BFF) 8 fps | 15 | FRP: ITL: PFF: | T0B0 T2B2 00 00 0 0 00 11 | T0B0 T2B2 11 00 0 0 11 01 | T0B0 T3B2 11 10 0 1 11 10 | T0B0 T3B3 11 01 0 0 11 11 | T1B1 T3B3 00 00 0 0 00 11 | T1B1 T3B3 11 11 0 0 11 00 | T1B1 T4B4 11 00 1 0 01 11 | T2B1 T4B4 01 11 0 ... 10 ... | T2B2 ... 10 ... | |
| 8:7 (tFF) 8 fps | 15 | FRP: ITL: PFF: | T0B0 T2B2 00 00 0 0 00 11 | T0B0 T2B2 11 00 0 0 11 11 | T0B0 T2B3 11 10 0 1 11 01 | T0B0 T3B3 11 01 0 0 11 10 | T1B1 T3B3 00 00 0 0 00 11 | T1B1 T3B3 11 11 0 0 11 11 | T1B1 T4B4 11 00 1 0 01 00 | T1B2 T4B4 01 11 0 ... 10 ... | T2B2 ... 10 ... | |
| 2:3:3:2-1 (BFF) 5 fps | 5 | FRP: ITL: PFF: | T0B0 00 0 00 | T1B1 00 0 00 | T2B2 00 0 00 | T3B2 10 1 01 | T3B3 11 0 00 | T4B4 00 0 00 | T5B5 00 0 00 | T6B6 00 0 00 | T7B6 10 1 01 | T7B7 11 0 00 ... ... ... |

Taking as an example the 2:3 (top field first TFF) (even fields) at 24 frames per second (fps), the first frame (T0B0) is made up of a top field zero (T0) and a bottom field zero (B0). Thus, this is an example of top field first video format or cadence.

The next frame (T0B1) is the top field zero (T0), having been repeated, and a new bottom field, the bottom field number one (B1). Thus, in Table 1, frame T0B0 is followed by frame T0B1. The next line in the chart gives the field repetition pattern (FRP). The field repetition pattern for the first frame T0B0 is made up of two values, both of which are zero to indicate that there has not yet been any field repetition. But then examining T0B0 versus the next frame T0B1, the top field has been repeated since the top field is T0 in both cases. Thus, the first bit of the frame repeat pattern is one (after the second frame T0B1), to indicate that there is a repetition in the top field and the second bit is zero, to indicate that there is no repetition in the bottom field.

The next line is for interlaced video (ITL). Zero indicates that the frame is not interlaced and one indicates that it is interlaced.

The final line is the possible field first (PFF), which indicates whether it is a possible top field first or bottom field first. The PFF is initially zero before any frames arrive. The next value in the PEE line is 10. The one bit indicates that the current top field and the previous bottom field fit into a progressive frame and the next bit, which is zero, indicates that the previous top field and the current bottom field do not fit into a progressive frame.

There are also two special detection algorithms for mixed cadence detection and progressive versus interlaced video detection. Usually, at the bottom of the video frame, there is a subtitle for language or other information. Sometimes that subtitle or other information is overlaid on video having a different cadence that the subtitle. In order to detect mixed cadences, two new variances are created. The first new variance is top field difference between the bottom quarter of a current and a previous frame and the other new variance is bottom field difference between the bottom quarter of a current and a previous frame. If there is a mismatched cadence between the whole image and its bottom quarter, the video may be handled by a special routine for mixed cadence video and reconstructed using a de-interlacing engine in the default mode.

For progressive frame detection, motion information for each pixel between the current and previous frame, between top fields in the current frame and between bottom fields in the current frame are evaluated.

In accordance with some embodiments, there are 16 variances that are accounted for, together with a confidence level, mtag variable, and three variance records may be calculated in a first stage. The first 14 (variances [0]-[13]) of the 16 variances are differences for top and bottom fields for an entire current and previous frame. The last two variances (variances [14] and [15]) are for top and bottom field differences for the bottom one quarter of the current and previous frames. The 16 variances are set forth below.

TABLE 2

| Variance | Description |
|---|---|
| Variance[0] | Number of interlaced high-variance pixel pairs |
| Variance[1] | Number of progressive high-variance pixel pairs |
| Variance[2] | Difference between the previous bottom field and the current top field (CtPb) |
| Variance[3] | Difference between the previous top field and the current bottom field (CbPt) |
| Variance[4] | Difference between the previous top field and the current top field (CtPt) |
| Variance[5] | Difference between the previous bottom field and the current bottom field (CbPb) |
| Variance[6] | Difference between the current top field and the current bottom field (CtCb) |
| Variance[7] | total moving pixels |
| Variance[8] | Find tears between current top and bottom fields |
| Variance[9] | variance[7]-variance[8] |
| Variance[10] | Find tears between current top and previous bottom fields |
| Variance[11] | variance[7]-variance[10] |
| Variance[12] | Find tears between current bottom and previous top fields |

TABLE 2-continued

| Variance | Description |
| --- | --- |
| Variance[13] | variance[7]-variance[12] |
| Variance[14] | CtPt for ¾ * height to height |
| Variance[15] | CbPb from ¾ * height to height |

The first two variances (variances [0] and [1]) are based on the number of high-variance pixel pairs. They are identified and counted. First, a check determines whether the sum of the difference between the current and previous frame is larger than a temporal threshold, and whether current top and current bottom fields are different enough. If so, the interlaced high variance pixel is increased by 1.

The pseudocode is as follows:

```
if(Difference between Current top (cT) and
Previous top (pT) plus difference between Current
bottom (cB) fields and Previous bottom field (pB) >
Temporal Threshold)
  if(Difference_cT_cB > Difference_cT_cT +
  Difference_cB_cB)  Increase the number of
  interlaced high-variance pixel pairs by 1
```

Otherwise, if the current top and current bottom fields are riot different enough, the number of progressive high-variance pixel pairs is increased by 1.

Variances [2] through [6] are based on field differences. Assume that a current pixel is at (x,y) and y is the current top field line. The difference_cT_pT is equal to the square of (C(x,y)−P(x,y)), the difference_cB_pB=square of (C(x,y+1)−P(x,y+1)), the difference_cT_cB=square of (C(x,y)−C(x,y+1)), the difference_cT_cT=square of (C(x,y)−C(x,y+2)), and the difference_cB_cB=square of(C(x,y−1)−C(x,y+1)).

Variance 7 is based on the total moving pixels. The difference_cT=ABS(C(x,y−2)−C(x,y))+ABS(C(x,y)−C(x,y+2))+ABS(C(x,y−2)−C(x,y+2)) and difference_cB=ABS(C(x,y−1)−C(x,y+1))+ABS(C(x,y+1)−C(x,y+3))+ABS(C(x,y−1)−C(x,y+3)). Therefore, if the difference between the current frame and the previous frame is big enough (which means two co-located pixels are very different), and the difference between current top field and difference between bottom field are small enough (which means the pixel area does not have high texture areas and it would be difficult to get a big difference between the current and previous frames), then the number of moving pixels is increased by 1.

The pseudocode for determining the total moving pixels is as follows:

```
if(Difference_cT < Vertical Threshold &&
Difference_cB < Vertical Threshold)
  Increase the number of moving pixels by 1.
```

Variances [8] through [13] are based on the existence of tears. There are three kinds of tears. If a given pixel is a moving pixel, the difference between the given two top and bottom fields is above a threshold, and the difference of the two different fields is larger than the sum of two same field difference, the tear pixel number is increased. So, a tear uses the same idea as the interlaced high variance pixel with a different combination of top and bottom fields.

The pseudocode is as follows:

```
if(Difference_cT_cB >= Vertical Threshold &&
Difference_cT_cB > Difference_cT_cT +
Difference_cB_cB)    Increase Tear pixel_0 by 1;
  if(Difference_cT_pB >= Vertical
Threshold && Difference_cT_pB > Difference_cT_cT +
Difference_pB_pB)    Increase Tear pixel_1 by 1;
  if(Difference_cB_pT >= Vertical
Threshold && Difference_cB_pT > Difference_cB_cB +
Difference_pT_pT)    Increase Tear pixel_2 by 1;
}
```

The variable mtag represents a relationship between variances [4] and [5]. By normalizing and comparing variances [4] and [5] to a threshold, top and bottom field repetition can be calculated. When variance [4] is much bigger than variance [5], then the variable may be set to the number 4. When the variance [5] is much bigger than the variance [4], then the variable is 1 and, otherwise, the variable is 0. The variable updates an mtag history for fast cadence locking. This technique can be implemented by the following equation:

if ((variance[4]/α)>variance[5])

mtag=4;

else if ((variance[5]/α)>variance[4])

mtag=1;

else mtag=0;

where alpha is a threshold to determine the amount of difference between variance [4] and variance [5].

Thus, referring to FIG. 1, the sequence 10 may be implemented in software, firmware, or hardware. In a software embodiment, it may be implemented by instructions stored in a non-transitory computer readable medium, such as a magnetic, semiconductor, or optical memory. The sequence of instructions may be implemented by a processor or computer.

Once the variances are calculated (block 12), a check at diamond 14 determines whether the confidence level for the current case is sufficient. If the current confidence level is not high enough then a confirming cadence is determined at diamond 20. Depending on the three variance records, the cadence may be confirmed in diamond 20, based on whether the current cadence is correct or not. The three variance records may be compared to the fixed pattern for cadence in Table 1. If the current variable records are not identical to a fixed pattern, then the flow proceeds to checking cadence in diamond 22. Otherwise, a confidence value may be increased and the flow proceeds to checking the scene change in block 24.

In diamond 22, the variable records are calculated with new thresholds. The first step of this function is to calculate two thresholds that determine high and low variance values. Then the current cadence may be combined with the calculated page based on the two thresholds. The page is equal to the current frame number modulo the periodicity of the current cadence. The last step of checking cadence determines whether the three variance records of the estimated page are consistent with the fixed records of the current mode. If there is a match between the estimated page and the fixed current value, the flow proceeds to scene change check at block 24. Otherwise, the flow proceeds to detecting cadence at diamond 18 in order to estimate a new cadence. Detecting cadence is the same function used after locking cadence in diamond 16, which is a function for low confidence.

The locking cadence function 16 compares the three variant recodes with a fixed pattern of cadence. If there is a matched cadence, the new cadence is updated with the new page and confidence. If the newly estimated mode is not consistent with a previous cadence, then the flow goes to detecting cadence at diamond 18. The detecting cadence function may include two steps. In a first step, with the three variance records, new cadence, page, and confidence are estimated for modes 5:5, 2:3:3:2, 3:2:3:2:2, and 8:7. If there is no match, the current first and second variance records are compared for modes 2:3,3:2, and 2:3:3:2. If there is no match with a cadence, the current cadence is set to 60 interlaced (60i), which is the default cadence in one embodiment.

The scene change check at block 24 is a fallback mode for a frame that has a scene change. There are two summation values in the following equation:

$$FMD\_Sums[0] \mathrel{+}= variance[4] - variance[4] \text{ at previous 15 frames}$$

$$FMD\_Sums[1] \mathrel{+}= variance[5] - variance[5] \text{ at previous 15 frames}$$

Because there were no previous variances before the first 15 frames, FMD_Sums [0] for the first 15 frames accumulates variance [4], while FMD_Sums [1] for the first 15 frames accumulates variance [5]. After the first 15 frames, the two sums are updated with new variances and the old variance values are subtracted. If variance [4] is larger than half of FMD_Sums [0], a scene change is detected at the current frame and the current cadence is set to 60 interlaced. Also, if variance [5] is larger than half of FMD_Sums[1], a scene change is detected and the cadence is set to 60i.

In the next step (block 26), cadence estimating is based on the mtag and FMD_SeqMode. The 2:3 and 3:2 cadences have a small periodicity which is 5 frames. Therefore, these cadences may be used as a current cadence, while the algorithm goes to the final cadence. The mtag represents the relationship between the top field and the bottom field repetition. The FMD_SeqMode is a record for mtag when the current cadence is either 2:3 or 3:2. If a previous cadence is either 3:2 or 2:3, the last digit of FMD_SeqMode is increased by 1. If the current cadence is either 3:2 or 2:3 and mtag equals 1, the last digit of FMD_SeqMode is set to 2. If the previous mode is either 3:2 or 2:3 and mtag equals 4, the last digit of the FMD_SeqMode is set to 5. So if there are consecutive 2:3 and 3:2 modes of more than two frames in a row, then the cadence can be estimated based on m_FMD_SeqMode. By comparing FMD_SeqMode and the fixed mtag record value, the current cadence can be estimated promptly without confidence checking.

The next step (block 28) may involve special detection for 2:2 versus 60i based on variances [8]-[13]. The variances [8]-[13] represent a tear in a current and previous frames. For example, variance [8] is a number of tear pixels between current top and bottom fields. If the difference between the current top and bottom fields is larger than a sum of differences between the current top field lines at y and the line below the current line by 2 lines (y−2) and a difference between current bottom lines at y−1 and the 3 lines below the current line (y−3), this pixel is denominated a tear pixel. By comparing the number of tear pixels between current top and bottom fields with current top and previous bottom fields, and between current bottom and previous top fields, the video can be identified as progressive or interlaced video.

Once a cadence and page have been estimated for the current frame, the frame restoration (block 30) becomes straightforward. The FMD function can be called for every other field. Therefore, there are two pages. One page is for the previous field and the other page is for the current field. The page of each cadence has information for repeating top and bottom fields or not repeating. Thus, there are three combinations. The top field could be the previous frame and bottom field could be the current frame, the top field could be the current frame and the bottom field could be the previous frame, or the top field could be the current frame and the bottom field is the previous frame.

In accordance with some embodiments, 14 variables and 3 variance records may be used to match the current calculated pattern with a fixed top field first pattern. By confidence checking, the conventional algorithm changes the cadence.

Some embodiments can handle not only top field first, but 7 new cadences as well, 6 for bottom field first and another for 2:3:3:2 of top field first. To detect a cadence quickly, in some embodiments, the record of the relationship between the top field and the bottom field repetition is used. By using the record of that relationship, the system can detect a correct cadence without a confidence check. By combining these two informations, the cadence can be detected quickly and accurately, in some embodiments.

In addition, progressive video may be detected by generating three different tear pieces of information based on the current and previous frames and obtaining the ratios of interlaced to progressive-like pixels. By comparing these ratios based on the characteristics of interlaced and progressive video sequences, progressive frames may be classified for mixed, interlaced/progressive frame sequences.

For more accurate detection of a mixed cadence video, the same types of variances may be calculated in different areas of the frame. By comparing statistics between the whole image and part of the image, mixed cadence can be detected before overlaid text affects statistics for the whole image.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    identifying mixed cadence videos, wherein mixed cadence videos are videos which have two different cadences in the same display or frame by calculating three variances, the first variance being a difference between top field recognition between a current and previous frame, a second variance being a difference between bottom field repetition between a current and previous frame and a third variance based on a difference between a current top field and bottom field.

2. The method of claim 1 including calculating variances of different areas within a frame.

3. The method of claim 1 including identifying a cadence of video by using the relationship between top field and bottom field repetition.

4. The method of claim 3 including identifying the cadence of video without a confidence check.

5. The method of claim 1 including identifying progressive video based on tear information.

6. The method of claim 5 including determining the ratio of interlaced and progressive-like pixels.

7. The method of claim 1 including determining the total number of moving pixels.

8. The method of claim 1 including determining whether variance records correspond to a known fixed cadence.

9. A non-transitory computer readable medium storing instructions, executed by a processor, to
    identify mixed cadence videos, wherein mixed cadence videos are videos which have two different cadences in the same display or frame by calculating three variances, the first variance being a difference between top field recognition between a current and previous frame, a second variance between a difference between bottom field repetition between a current and previous frame and a third variance based on a difference between a current top field and bottom field.

10. The medium of claim 9 further storing instructions to calculate variances of different areas within a frame.

11. The medium of claim 9 further storing instructions to identify a cadence of video by using a relationship between top and bottom field repetition.

12. The medium of claim 11 further storing instructions to identify the cadence of video without a confidence check.

13. The medium of claim 9 further storing instructions to identify progressive video based on tear information.

14. The medium of claim 13 further storing instructions to determine the ratio of interlaced and progressive-like pixels.

15. The medium of claim 9 further storing instructions to determine the total number of moving pixels.

16. The medium of claim 9 further storing instructions to determine whether variance records correspond to a known fixed cadence.

17. An apparatus comprising:
    a storage; and
    a processor coupled to said storage, said processor to identify a mixed cadence video, wherein mixed cadence videos are videos which have two different cadences in the same display or frame by calculating three variances, the first variance being a difference between top field recognition between a current and previous frame, a second variance between a difference between bottom field repetition between a current and previous frame and a third variance based on a difference between a current top field and bottom field.

18. The apparatus of claim 17 wherein said apparatus is a graphics processing unit.

19. The apparatus of claim 17, said processor to identify video using a 2:3:3:2 top field first and to identify mixed cadence videos, wherein mixed cadence videos are videos which have two different cadences in the same display or frame.

20. The apparatus of claim 19, said processor to calculate variances of different areas within a frame.

21. The apparatus of claim 17, said processor to identify a cadence of video by using the relationship between top field and bottom field repetition.

22. The apparatus of claim 21, said processor to identify the cadence of video without a confidence check.

23. The apparatus of claim 17, said processor to identify progressive video based on tear information.

24. The apparatus of claim 23, said processor to determine the ratio of interlaced and progressive-like pixels.

25. The apparatus of claim 17, said processor to determine the total number of moving pixels.

26. The apparatus of claim 17, said processor to determine whether variance records correspond to a known fixed cadence.

* * * * *